W. A. PAINE.
FLEXIBLE CONNECTION FOR PUMPING MECHANISMS.
APPLICATION FILED JULY 10, 1908.
929,164.
Patented July 27, 1909.
2 SHEETS—SHEET 2.
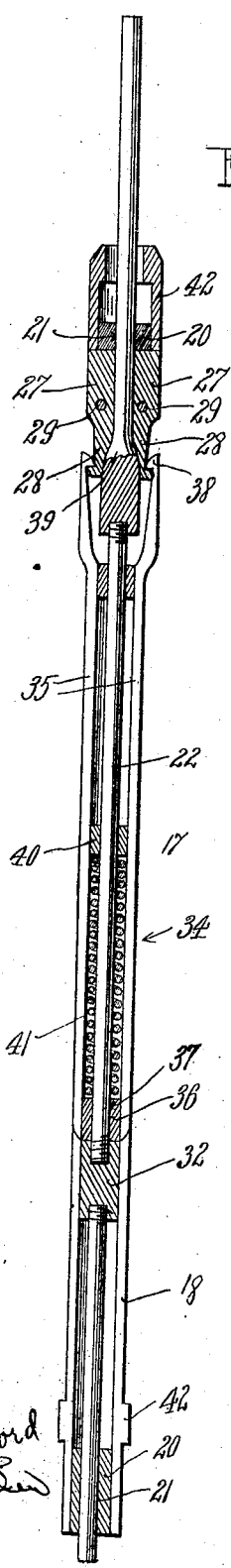
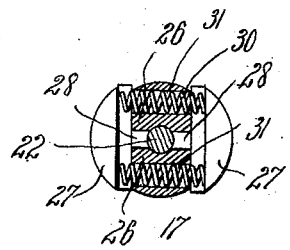
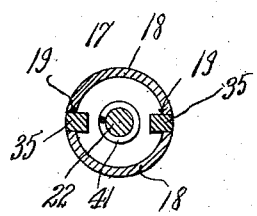
Witnesses
J. H. Crawford
Inventor
William A. Paine,
By
Attorneys

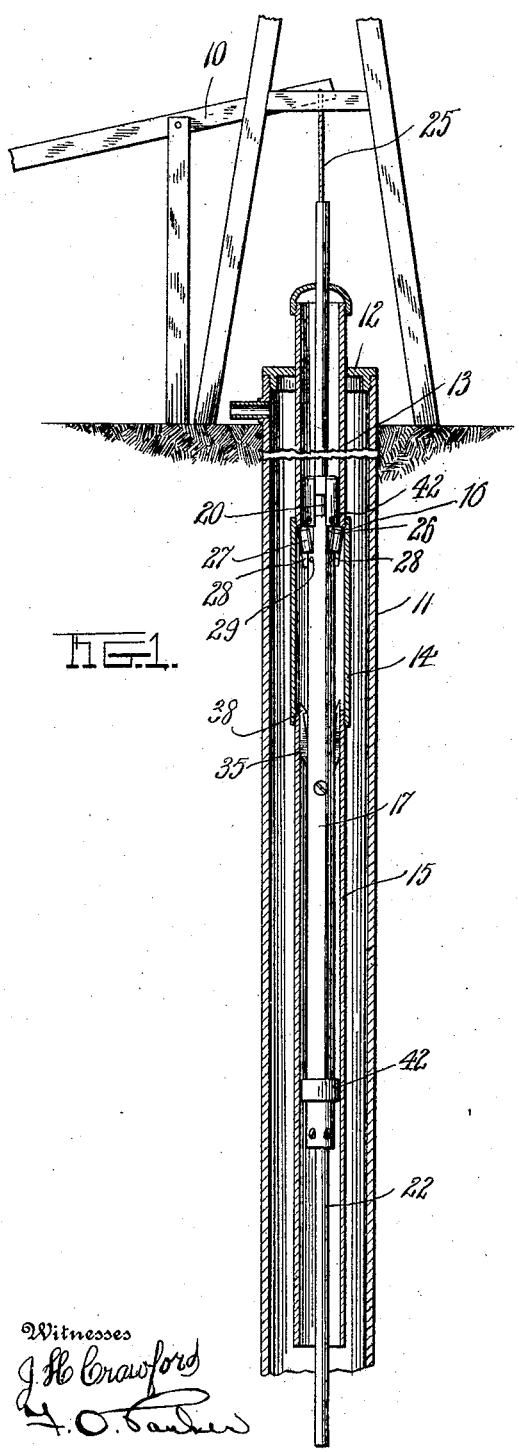

UNITED STATES PATENT OFFICE.

WILLIAM A. PAINE, OF ORCUTT, CALIFORNIA.

FLEXIBLE CONNECTION FOR PUMPING MECHANISMS.

No. 929,164.  Specification of Letters Patent.  Patented July 27, 1909.

Application filed July 10, 1908. Serial No. 442,938.

*To all whom it may concern:*

Be it known that I, WILLIAM A. PAINE, a citizen of the United States, residing at Orcutt, in the county of Santa Barbara, State of California, have invented certain new and useful Improvements in Flexible Connections for Pumping Mechanism; and I do hereby declare the following to be a full, clear, and exact description of the invention, such as will enable others skilled in the art to which it appertains to make and use the same.

The invention relates to a flexible connection for pumping mechanism and is particularly adapted for oil and the like wells.

The primary object of the invention is the provision of a flexible connection between the walking beam and the piston rod of pumping mechanisms in which the piston at the end of its up-stroke is retracted to thereby keep the lifting cable taut.

Another object of the invention is the provision of a flexible connection for pumping mechanism which comprises a removable casing or shell fitted within the pump tube and a spring tensioned slidable piston rod associated with the casing or shell and a flexible connection between the piston rod and a walking beam of pumping mechanism whereby the rod may be actuated.

With these and other objects in view the invention consists in the construction, combination and arrangement of parts as will be hereinafter described in detail and as illustrated in the accompanying drawings which disclose the preferred form of embodiment of the invention.

It is to be understood that changes, variations and modifications may be made such as come properly within the scope of the claims hereunto appended without departing from the spirit of the invention.

In the drawings:—Figure 1 is a view of a portion of a walking beam with the well tube in section and the invention applied thereto. Fig. 2 is a sectional view of the flexible connection removed from its working barrel. Fig. 3 is a longitudinal sectional view with the piston rod in a raised position. Fig. 4 is a transverse sectional view. Fig. 5 is a further transverse sectional view.

Similar reference characters indicate corresponding parts throughout the several views in the drawings.

In the drawings, the numeral 10 designates a walking or rocking beam of the ordinary type used in pumping mechanism and 11 the well tube section having connected thereto by a threaded head coupling 12 a working barrel comprising an upper tube section 13 connected by an enlarged coupling section 14 to a lower terminal tube 15 the end of which upper tube section projects into the enlarged coupling section 14 a suitable distance as at 16 to form an abutment terminal.

Within the working barrel is mounted a casing or shell 17 including spaced semicircular side sections 18 to form opposed longitudinal guide slots 19 and united at opposite extremities by guide heads 20 having alining openings 21 into which is slidably mounted a piston rod 22 the lower extremity of which carries the ordinary form of piston not shown and the upper extremity has secured therein one end of a flexible connection such as a line wire 25 which latter has its opposite end connected to the walking beam 10 of the pumping apparatus.

The upper extremity of the casing or shell 17 has opposed offsets 26 to accommodate locking jaw heads 27 having finger extensions 28 which latter are pivoted as at 29 to the shell or casing. The said locking jaw heads 27 are held in a position to engage the abutment extremity 16 by expansion springs 30 loosely supported in transverse openings 31 in the upper guide head 20 and the opposite extremities of said springs having their bearing against the inner faces of the locking jaw heads to hold the same spread with respect to each other whereby the casing or shell 17 is held against removal from the pipe section 13 at the upper extremity of the well tube.

Carried by the piston rod 22 is a coupling block or collar 32 forming a bearing for a grab member 34 having oppositely disposed parallel arms 35 slidable in the elongated or longitudinal slots 19 and which arms are united by a cross connection 36 having a central opening 37 receiving the piston rod. The free ends of the arms form grab extremities 38 and are adapted to be brought into locking engagement with the finger extensions 28 of the locking jaw heads upon the full upward movement of the piston rod and to bring the finger extensions 28 into locked engagement with the grab extremities 38 and also to actuate the locking jaw heads 27 to bring the same to a locked position there is provided a spreader member 39.

It is obvious that when the piston rod is moved to its fullest extent on the up-stroke thereof, the spreader member 39 will pass between the contracted lower extensions 28 of the locking jaw heads 27, so as to move the latter into a position to have their outer faces lie flush with the outer surfaces of the centering members 42, so as to bring the finger extensions 28 into a position for locking engagement with the grab extremities 38 and thereby momentarily maintain the spring 41 retracted and also the piston in its raised position. The piston will remain in this position until the spreader member is lowered, so as to permit the finger extremities to move inwardly for disengagement with the grab members, whereupon the said piston will effect its down stroke due to the action of the expansion spring 41 acting thereon. It is apparent that the flexible connection 25 will always be maintained taut when the piston is making its up and down stroke due to the action of the expansion spring.

Within the casing or shell 17 centrally thereof and secured to its side sections 18 is a bearing collar 40 forming a bearing seat for one extremity of a coiled tension spring 41 surrounding the piston rod 22 and having its opposite end bearing against the cross connecting piece 36 of the grab member 34 to automatically return the piston rod to seat its valve after having been raised by a walking beam.

To properly center the casing or shell 17 within the working barrel there is provided at opposite extremities of said casing semi-circular centering members 42 the uppermost one of which snugly fits within the upper tube 13 while the lowermost member snugly fits within the lower tube section.

What is claimed is—

1. The combination with a walking beam and a well tube, of a working barrel connected to said well tube, a removable casing mounted in said barrel, locking jaw heads pivotally connected to the casing to detachably hold the latter in the barrel, a piston rod slidable through said casing, a grab member mounted upon said piston rod and adapted to be brought into locking engagement with the locking jaw heads, a tension spring acting upon said piston rod, a flexible connection between the piston rod and the walking beam and a spreader member on the piston rod to actuate the locking jaw heads to permit withdrawal of the casing from the barrel.

2. In combination with a well tube and the rocking beam of pumping mechanism, of a tube section, a casing mounted within the tube section and removable therefrom, pivotal locking jaws carried by said casing for detachably connecting the latter to the tube section and having finger extensions, a tensioned piston rod slidable through said casing, a flexible connection between the piston rod and said rocking beam, a grab member mounted upon said piston rod and adapted for locking engagement with the finger extensions and a spreader member carried by the piston rod and adapted to operate upon the locking jaws whereby the same will be brought to a position for releasing the casing from the tube section.

In testimony whereof, I affix my signature, in presence of two witnesses.

WILLIAM A. PAINE.

Witnesses:
PERCIE JENKINS,
C. U. ARMSTRONG.